Aug. 6, 1940.    C. P. WEST    2,210,696
SWITCHBOARD
Filed June 30, 1939
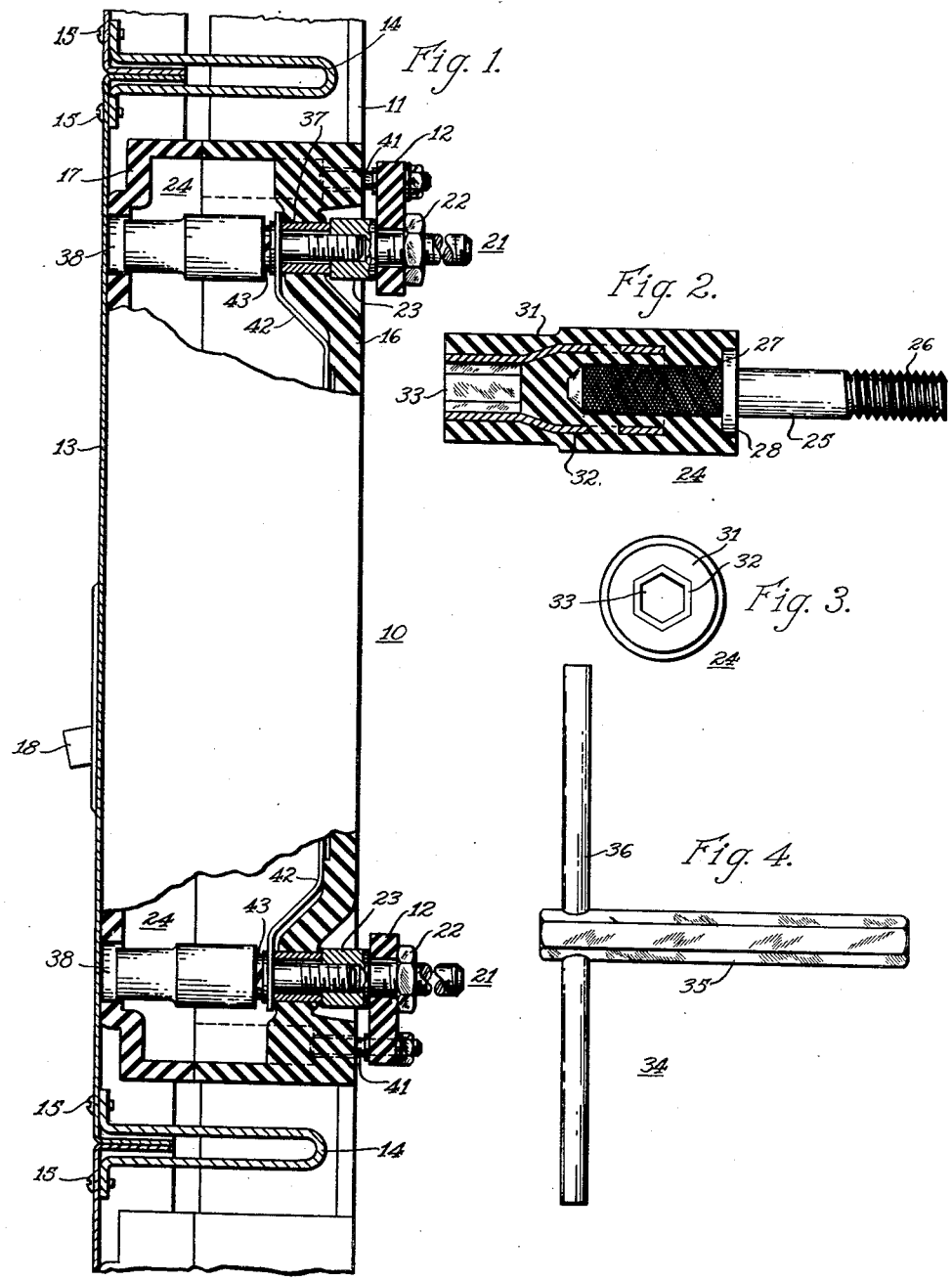
WITNESSES:
INVENTOR
Charles P. West.
BY
ATTORNEY Patented Aug. 6, 1940

2,210,696

UNITED STATES PATENT OFFICE 2,210,696

SWITCHBOARD

Charles P. West, Forest Hills, Pa., assignor to Westinghouse Electric & Manufacturing Company, East Pittsburgh, Pa., a corporation of Pennsylvania Application June 30, 1939, Serial No. 282,181

5 Claims. (Cl. 175—298)

My invention relates, generally, to switchboards and, more particularly, to dead front switchboard structures for supporting automatic circuit breakers of the enclosed type.

In Patent No. 2,050,378, issued August 11, 1936 to K. C. Randall and assigned to the Westinghouse Electric & Manufacturing Company, there is described a switchboard in which an enclosed circuit breaker unit is so mounted on a switchboard structure of the dead front type that the breaker unit may be readily removed from in front of the switchboard structure without removing or coming in contact with the bus bars or current conductors at the rear of the structure. However, in the foregoing structure, it is necessary to disconnect the breaker unit from the combined mounting and terminal studs which are energized by the potential of the power conductors, the breaker being disconnected by removing nuts from the front end of the studs. During the process of removing the nuts from the energized studs, there is a possibility of the operator being shocked or of the loose nuts dropping into the circuit breaker mechanism.

Therefore, an object of my invention, generally stated, is to provide an improved switchboard structure of the type disclosed in the aforementioned Randall Patent No. 2,050,378.

A more specific object of my invention is to provide for readily removing switching apparatus from in front of a switchboard structure without touching any energized parts.

Another object of my invention is to provide for removing an enclosed circuit breaker unit from a switchboard structure without opening the circuit breaker case.

A further object of my invention is to provide for so mounting a removable circuit breaker unit in a switchboard structure that all parts of the electrical circuit are joined by bolted connections instead of sliding contact members requiring springs or spring material to maintain contact pressure.

Other objects of my invention either will be explained fully hereinafter or will be apparent to those skilled in the art.

In accordance with one embodiment of my invention, an enclosed breaker unit slides into position on guide pins supported in a switchboard structure. A floating insulated screw or stud is mounted inside the breaker housing and it may be screwed into a fixed terminal stud to draw the current carrying parts of the breaker firmly into contact with the terminal stud. The floating stud is rotated by a key inserted through an opening in the breaker housing.

For a fuller understanding of the nature and objects of the invention, reference may be had to the following detailed description, taken in conjunction with the accompanying drawing, in which:

Figure 1 is a view, partially in section and partially in elevation, of a switchboard structure constructed in accordance with my invention;

Fig. 2 is an enlarged view, in section, of the insulated floating stud utilized for connecting the circuit breaker to a fixed terminal stud;

Fig. 3 is an end view of the stud shown in Fig. 2, and

Fig. 4 is a view, in side elevation, of a key which may be utilized for rotating the floating stud.

Referring now to the drawing, and particularly to Figure 1, the portion of a switchboard structure shown comprises an enclosed circuit breaker unit 10, an upright frame member 11, which may be an angle-iron bar, a pair of insulating supporting members 12, which may be secured to the upright member 11 in the manner shown in the aforementioned patent to Randall to support the breaker unit 10, and a switchboard panel 13 which is removably attached to a pair of U-shaped members 14 by screws 15. Since the general switchboard structure may be similar to that described in the aforementioned Randall patent, it is believed to be unnecessary to set forth any further description of the switchboard structure in the present application.

The structure of the breaker unit 10 also will not be described in detail, as the present invention may be utilized with any enclosed circuit breaker, or other apparatus unit, designed for switchboard mounting. As shown, the breaker unit 10 is provided with an insulating casing 16, having a removable cover 17, and an operating handle 18 which projects through an opening in the panel 13.

Terminal studs 21 are secured to the supporting members 12 by nuts 22 for electrically connecting the terminals of the apparatus unit 10 to power conductors (not shown) which may be connected to the studs 21 at the rear of the switchboard structure. It will be understood that an individual terminal stud is provided for each terminal of the apparatus unit, thus six terminal studs 21 are provided for a three-pole circuit breaker unit of the type illustrated. Each stud 21 is provided with a head 23 having a tapped hole therein, to which the breaker terminals are connected.

In order that the breaker may be disconnected from the terminal studs 21 and removed from in front of the supporting structure without handling any electrically energized parts, floating studs or screws 24 are rotatably mounted inside of the casing 16 for electrically connecting the breaker to the terminal studs 21. As shown in Fig. 2, each one of the floating studs comprises a bolt or screw 25 having a threaded portion 26 at one end and a knurled portion 27 at the other end. A shoulder 28 is provided at approximately the middle of the shank of the bolt 25.

The stud 24 is provided with a head 31 which may be composed of insulating material moulded around the knurled portion 27 of the bolt 25. A metal insert 32, having a hexagonal-shaped opening 33 at one end, is moulded into the head 31. Thus, a hexagon key 34, comprising a hexagon bar 35 and a handle 36, as shown in Fig. 4, may be utilized to rotate the stud 24.

As shown in Fig. 1, the stud 24 floats in the breaker unit, one end being carried by a metal insert 37, preferably copper, disposed in the casing 16, and the other end being supported by the cover 17. An opening 38 is provided in the cover 17 through which the key 34 may be inserted into the hexagon opening 33 in the head 31 of the stud 24.

In addition to the terminal studs 21, guide pins 41 are secured to the insulating supporting members 12. The guide pins 41 cooperate with the terminal studs 21 in supporting the breaker unit 10. The breaker unit slides into position on the guide pins 41, thereby aligning the bolts 25 with the tapped openings in the heads 23 of the terminal studs 21. When the breaker is in position, the hexagon key 34 is inserted into the insulated head of the stud 24 and the bolt 25 screwed into the head 23.

In this manner, a conductor 42, which is connected to the breaker contact members, is drawn firmly into contact with the copper insert 37, which, in turn, is pressed against the head 23 of the copper stud 21 to conduct current from the conductor 42 to the terminal stud 21. If desired, washers 43 may be inserted between the shoulder 28 on the bolt 25 and the conductor 42.

It will be understood that each one of the floating studs 24 may be screwed into its corresponding terminal stud 21 in the foregoing manner to complete the terminal connections. After the connections are completed, the panel 13 may be placed in position to cover the openings 38 in the breaker housing.

When it is desired to remove the breaker unit, the panel 13 is first removed, after which the floating studs 24 are screwed out of the terminal studs 21. After all of the studs are disconnected, the breaker unit may be removed from the guide pins 41 toward the front of the switchboard structure. It is not necessary to remove any connections at the rear of the structure or to handle any energized parts during either the installation or the removal of the breaker unit.

From the foregoing description, it is apparent that I have provided an improved switchboard structure which permits an apparatus unit to be removed easily from in front of the structure without touching any energized parts. Furthermore, all parts of the electrical circuit are securely bolted together, thereby insuring good electrical contact between the separable conductors. Also, the housing of the apparatus unit is left closed at all times to prevent tampering with the mechanism of the unit and to prevent foreign material getting into the unit.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a switchboard structure, in combination, a supporting member, a terminal stud secured in said member, an apparatus unit removably disposed in front of said terminal stud, said unit having an enclosed casing therefor, and an insulated stud rotatably mounted inside of said casing for electrically connecting the unit to one end of the terminal stud and mechanically supporting the casing, said casing having an opening therein for the insertion of means for turning the rotatable stud, whereby said unit may be disconnected from the terminal stud without opening said casing and without loosening the terminal stud from said supporting member.

2. In a switchboard structure, in combination, a supporting member, terminal means secured in said member, an apparatus unit removably disposed in front of said terminal means, said unit having an enclosing casing therefor, and connecting means rotatably mounted inside of said casing for electrically connecting the unit to the terminal means and mechanically supporting the casing, said connecting means having an insulating head secured thereto, said casing having an opening therein for the insertion of means for engaging said insulating head to rotate the connecting means, whereby said unit may be disconnected from the terminal means without opening said casing and without loosening the terminal means from said supporting member.

3. In a switchboard structure, in combination, a supporting member, a guide pin secured in said member, a terminal stud also secured in said member, an enclosed apparatus unit removably mounted on said guide pin, a connecting stud rotatably mounted inside of said apparatus unit for electrically connecting the unit to one end of the terminal stud, whereby said terminal stud and said guide pin cooperate in supporting the apparatus unit, said connecting stud having an insulated head secured thereto, and said apparatus unit having an opening therein for the insertion of means for engaging said head to rotate the connecting stud.

4. In a switchboard structure, in combination, a supporting member, a guide pin secured in said member, a terminal stud also secured in said member, an enclosed apparatus unit removably mounted on said guide pin, a connecting stud rotatably mounted inside of said apparatus unit for electrically connecting the unit to one end of the terminal stud, whereby said terminal stud and said guide pin cooperate in supporting the apparatus unit, said connecting stud having an insulated socket head secured thereto, and said apparatus unit having an opening therein through which operating means may be inserted into said socket to rotate the connecting stud.

5. In a switchboard structure, in combination, a supporting member, a guide pin secured in said member, a terminal stud also secured in said member, an apparatus unit removably mounted on said guide pin, said unit having an enclosing casing therefor, a connecting stud rotatably mounted inside of said casing and supported thereby for electrically connecting the unit to one end of the terminal stud, whereby said terminal stud and said guide pin cooperate in supporting the apparatus unit, said connecting stud having an insulated head secured thereto, said casing having an opening therein for the insertion of means for engaging said head to rotate the connecting stud, and a switchboard panel removably disposed in front of the apparatus unit to cover said opening, whereby the apparatus unit is removable from in front of the switchboard structure by removing said panel to expose said opening.

CHARLES P. WEST.